Figure 1:
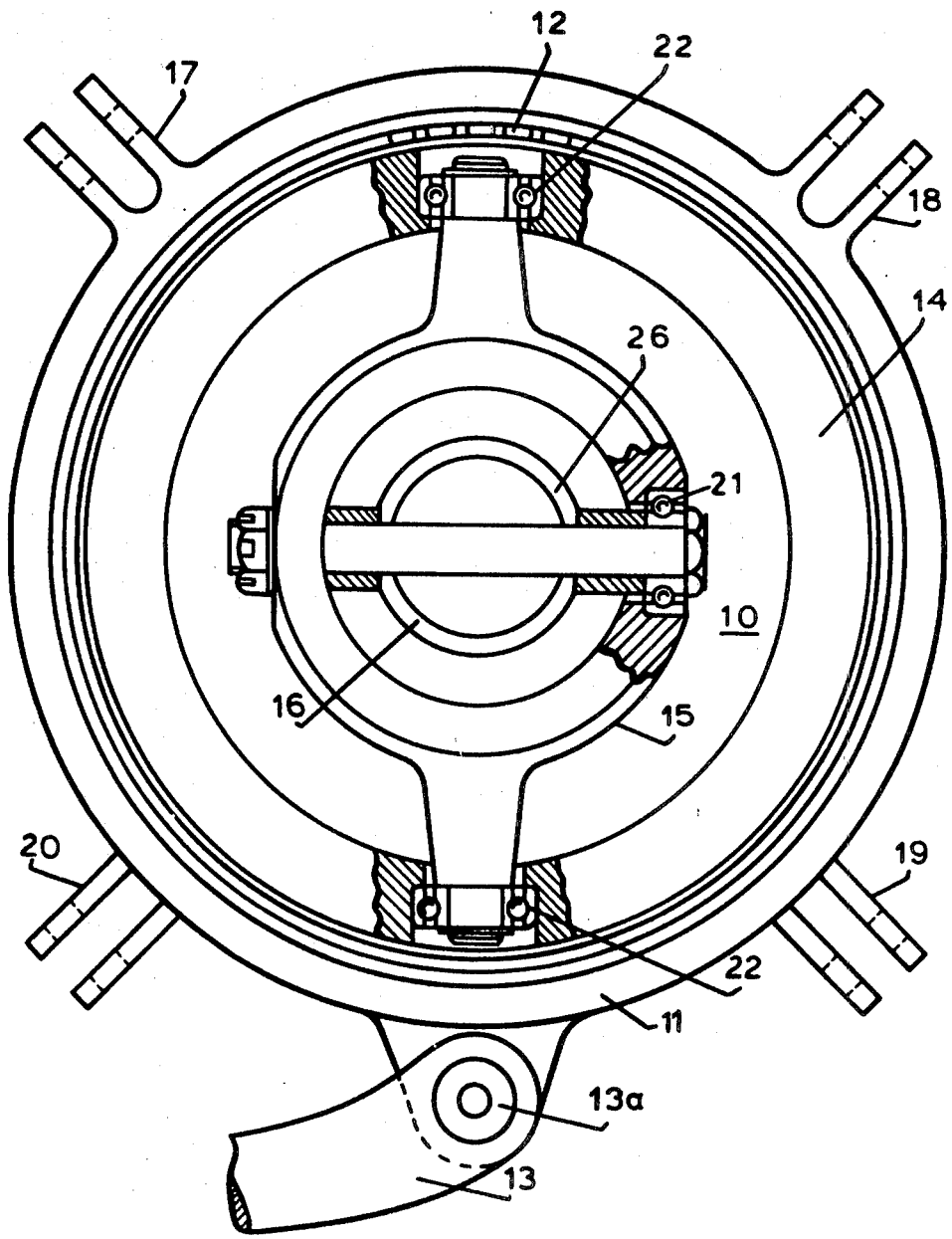

United States Patent

[11] 3,602,059

| | | | |
|---|---|---|---|
| [72] | Inventor | Robert J. Jupe | |
| | | Yeovil, Somerset, England | |
| [21] | Appl. No. | 840,944 | |
| [22] | Filed | July 11, 1969 | |
| [45] | Patented | Aug. 31, 1971 | |
| [73] | Assignee | Westland Aircraft Limited | |
| | | Yeovil, Somerset, England | |
| [32] | Priority | Aug. 9, 1968 | |
| [33] | | Great Britain | |
| [31] | | 38197/68 | |

[54] SWASH PLATE CONTROL MECHANISMS
4 Claims, 4 Drawing Figs.

[52] U.S. Cl. ................................................. 74/469
[51] Int. Cl. ............................................... G05g 1/00
[50] Field of Search .......................................... 74/469,
522, 516, 518

[56] References Cited
UNITED STATES PATENTS
3,218,874  11/1965  Gerstenhauer ............... 74/469 X

*Primary Examiner*—Milton Kaufman
*Attorney*—Larson, Taylor and Hinds

ABSTRACT: A swash plate control mechanism comprising a gimbal-mounted inner portion with a fixed central mounting and an outer portion rotatable about a predetermined arc of movement; the inner portion is tiltable about any axis through the fixed center mounting independently or in cooperation with the rotational movement of the outer portion.

The mechanism is operably associated with mechanically linked control rods on the outer and inner portions of the swash plate mechanism, so that rotation of the outer portion will increase or decrease the range of movement between pairs of controls rods, giving a variable differential ratio between said pairs of rods controlled by the movement of the swash plate mechanism.

SWASH PLATE CONTROL MECHANISMS

This invention relates to a swash plate control mechanism, particularly, but not exclusively, for the interconnection of controls where varying ratios of applied control to total control range are required, for instance, operation of collective and cyclic pitch changes on convertible rotorcraft requiring varying degrees of mixing and phasing out of the relationship of one section of the control to another, particularly during a transition from vertical flight to level flight, and vice versa.

This mechanism may be used for control systems on waterborne craft, hydrofoil supported craft, hovercraft, and will have many applications in the field of automation, where predetermined ratios of movement are necessary. It may be governed by fluidic or other means.

It is an object of the invention to provide a swash plate control mechanism whereby a varying range of input to output ratios of movement can be obtained in mechanical, electrical, or fluid-operated control systems.

According to the invention, I provide a gimbal swash plate control mechanism operably associated with mechanically linked rods or levers so arranged that movement of said swash plate mechanism about a predetermined arc of rotation increases or decreases the range of movement of two or more control rods or levers relative to each other, giving a variable differential ratio between said pairs of rods or levers controlled by the movement of said swash plate mechanism.

In a preferred embodiment of the invention said swash plate mechanism comprises a gimbal mounted inner portion with a fixed central mounting and an outer portion rotatable about a predetermined arc of movement, said inner portion being tiltable about any axis through said fixed center mounting independently or in cooperation with the rotational movement of said outer portion.

In one feature of the invention adjustment means are provided to increase or decrease said arc of rotation of said outer portion.

In another feature of the invention said outer portion is fixed and said inner portion is rotatable about a predetermined arc of movement and tiltable about any axis through said fixed center mounting independently or in cooperation with said rotational movement, said outer portion being tiltable in cooperation with said inner portion.

The rotational movement of said outer or inner portion may be controlled manually or by automatic interconnection means.

Figure 2:
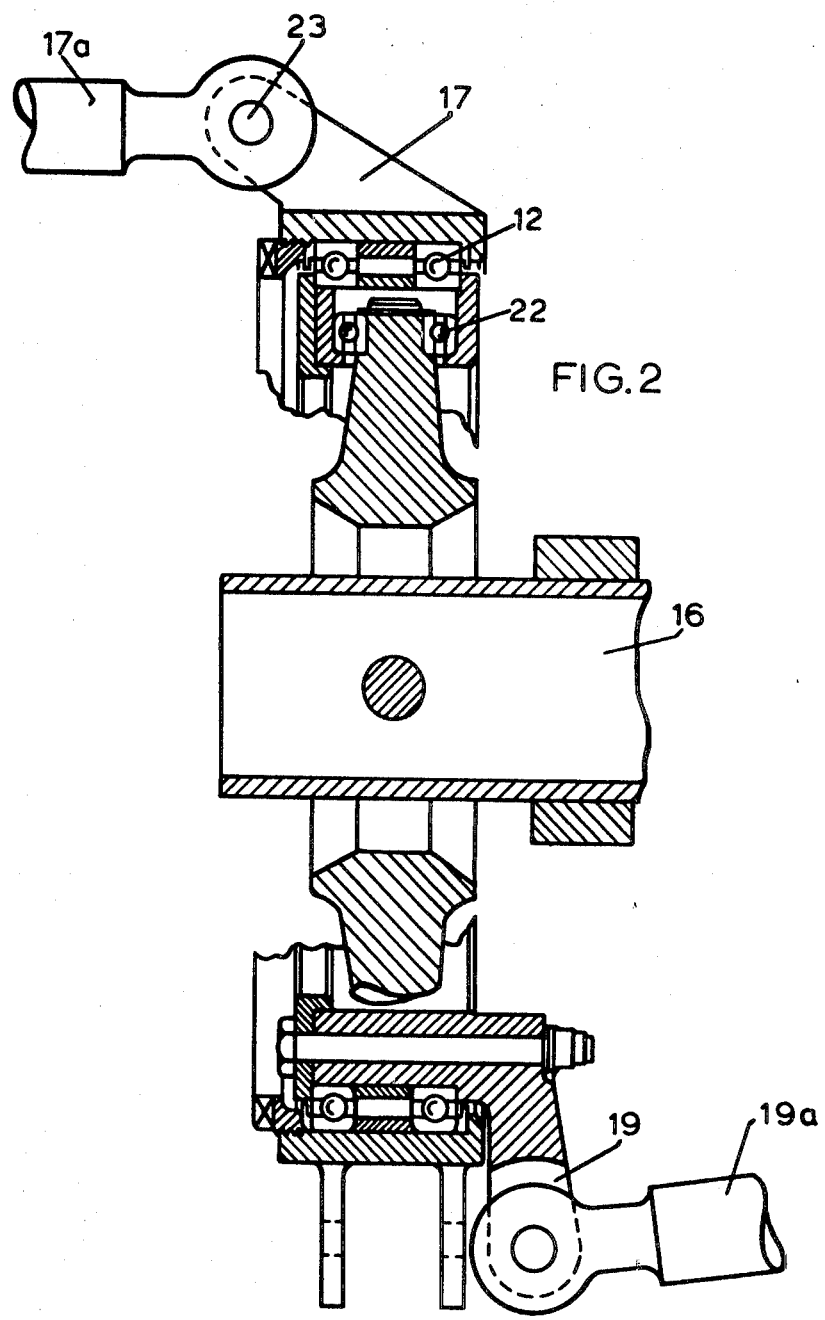
Figure 3:
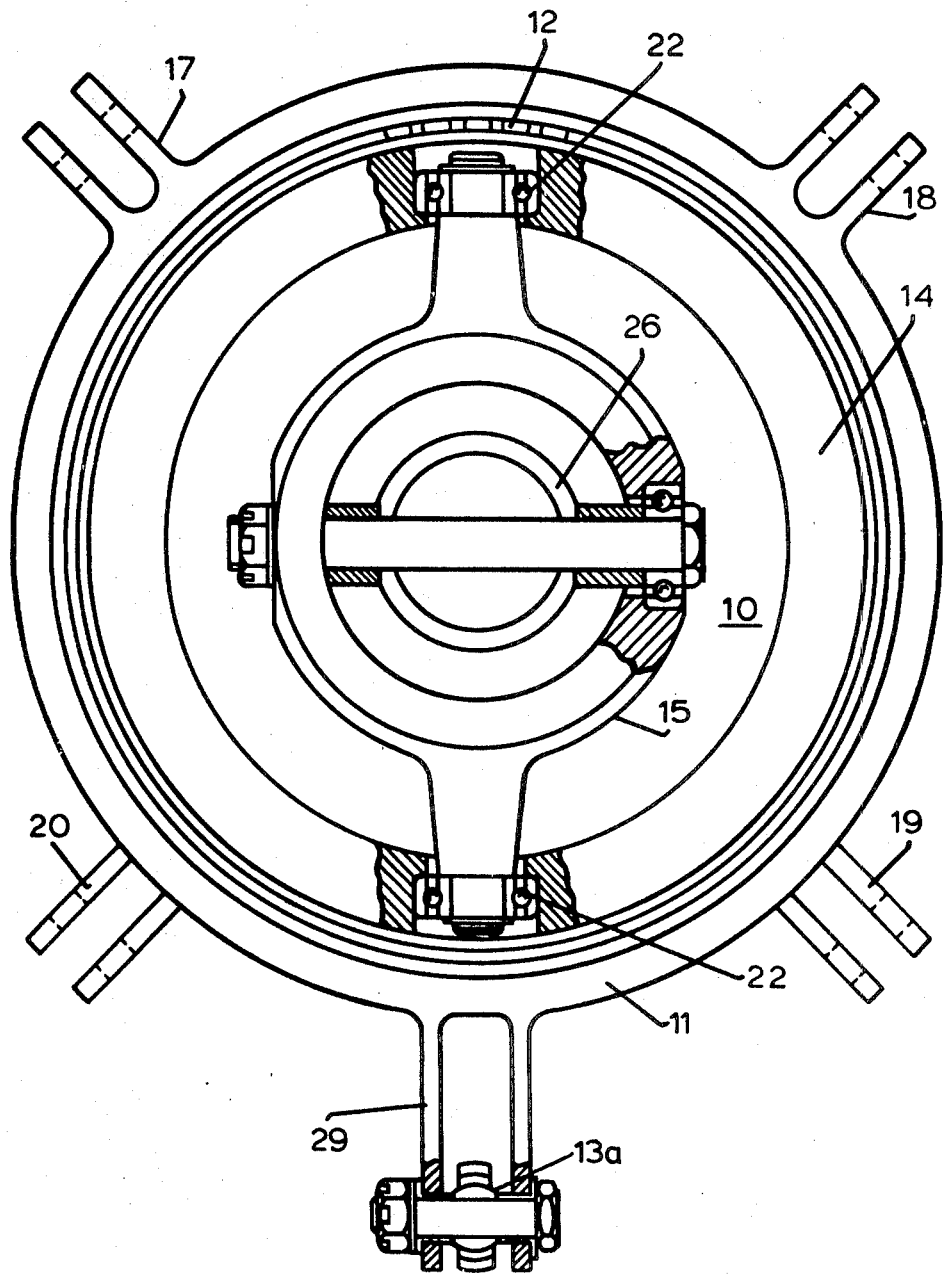
Figure 4:
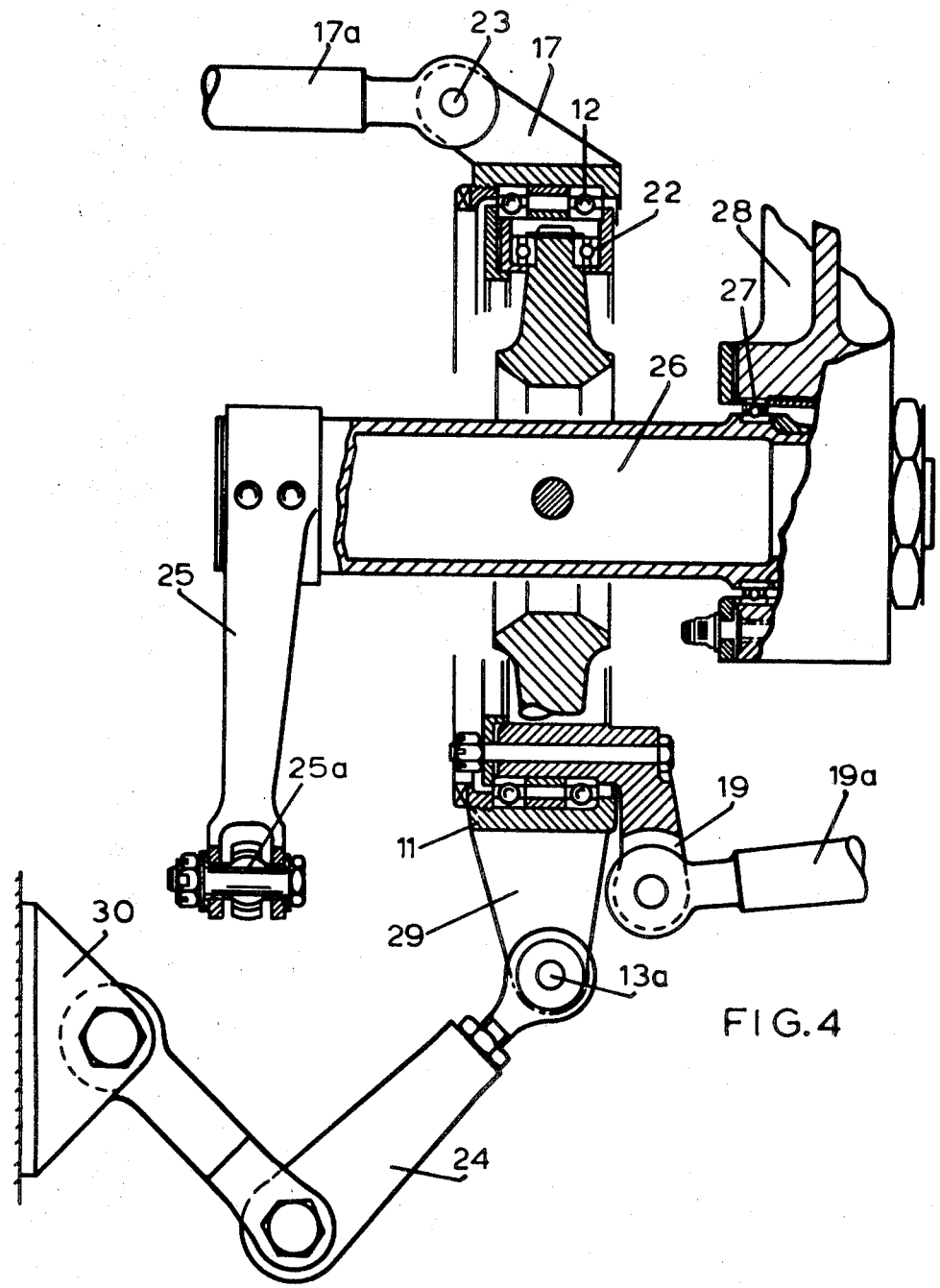

The invention will now be described with reference to the accompanying drawings, in which:

FIG. 1 is a general arrangement of the swash plate mechanism in a preferred embodiment with the inner portion gimbal mounted and the outer portion rotatable, FIG. 2 is a section of FIG. 1, FIG. 3 is a general arrangement of the swash plate mechanism in another embodiment with the inner portion rotatable and gimbal mounted, the outer portion being fixed, and FIG. 4 is a section of FIG. 3.

Referring to FIG. 1, the swash plate mechanism is generally indicated at 10, the outer portion 11 will rotate on bearings 12 about a predetermined arc of movement controlled by operating link 13 connected by a universal bearing 13a.

Inner portion 14 does not rotate and is gimbal mounted at 15, allowing the complete swash plate mechanism 10 to tilt about any axis on bearings 21 and 22 through fixed mounting 16 comprising the mounting which may be part of or attached to the relevant structure of the aircraft or other forms of structure associated with the particular application of the swash plate mechanism.

Two output control mounting lugs 17 and 18 are shown as part of the outer rotating portion 11 and two input control mounting lugs 19 and 20 on the inner portion 14. These are shown by way of example only and may be reversed, namely, the input control lugs being used as control outputs and the output control lugs as control inputs.

Referring to FIG. 2, an input and a corresponding output control mounting lug are shown connected to a control rod 19a and 17a respectively.

To enable the operation of the swash plate mechanism to be clearly shown in relation to FIGS. 1 and 2, the pairs of input and output controls, have been indicated at 180° apart, which will give a 1/1 ratio of movement of input to output, the same ratio of movement being obtainable with the input and output controls in line.

This differential ratio of movement between the input and output controls is variable over a range of 90° obtained by rotation of the outer rotating portion 11 of the swash plate mechanism. When, however, the input control is at 90° relative to the output control, the latter is completely phased out, since an applied push or pull load at the input will tilt the swash plate mechanism, the output control remaining stationary as the swash plate mechanism will tilt about the axis of the output control universal coupling.

The above description is by way of example only, since the differential ratio between pairs of control rods or levers may be changed to suit any particular application, by decreasing the arc of movement of 90°, adjustment means (not shown) being provided to enable this change to be carried out.

The swash plate mechanism described is not limited to a pair of input and output controls as shown, neither is the differential ratio of applied control to total control available necessarily identical for each input and output, since the disposition of the control-mounting lugs on either the outer rotating portion 11 or the inner portion 14 of the swash plate mechanism may be arranged to produce any combination of differentials required.

Suitable lost motion means may be incorporated in the rods or levers or mounting lugs to prevent backlash or unwanted movements of small magnitude being transmitted to or through the swash plate mechanism.

It will be appreciated that alternative mechanical arrangements of the swash plate mechanism are possible and may be desirable to suit certain applications.

Such an alternative is shown on FIGS. 3 and 4, where the inner portion 14 is rotatable to provide the differential ratio of movement, the outer portion 11 being fixed, but still tiltable in cooperation with the inner portion.

Referring to FIGS. 3 and 4, identical numerals to those shown on FIGS. 1 and 2 have been used to show identical parts.

The fixed mounting 16 (FIG. 1) is arranged to rotate with the inner portion 14 and is indicated in its new form at 26, one end of the mounting being contained within housing and bearings 27 and fixed to a relevant structure 28 associated with the particular application of the swash plate mechanism.

Lever 25 is located at the opposite end of the mounting 26, and is provided with a universal bearing 25a for the attachment of an operating rod to control the degree of rotation of the inner portion 14 on bearings 12, without interfering with the tilting characteristics.

Control mounting lugs 19 and 20 move with inner portion 14 relative to control-mounting lugs 17 and 18 on fixed outer portion 11, thereby producing a variable differential ratio of movement between applied control and total control.

The outer portion 11 is prevented from rotating by scissor linkage 24, one end of the linkage being attached to mounting lug 30, which is fixed to a suitable position on the relevant structure, and the other end is attached to lug 29 by universal bearing means 13a, these means being necessary to allow the outer portion 11 to tilt in cooperation with inner portion 14.

In operation, the two forms of swash plate mechanism are identical; in certain applications, however, one particular form may be preferable for ease of installation.

These alternatives have not been described in detail since the operation is not affected, and the varying degrees of differential ratio between the applied control and total control are obtainable by the method already described.

It will be appreciated that modifications to engineering details can be carried out without departing from the scope of the invention. For instance, the rotatable portion of the swash plate mechanism may incorporate a ball race, or rollers, or plain bearings. In some applications the rotatable portion may be supported by an air bearing.

In some applications of this invention, for example, for pitch, roll or directional control of hydrofoil vessels, for skirt-lift control or propeller-pylon control on multidirectional propeller installations on air cushion vehicles, for submarine hydrovane control, it may be preferable to provide universal connecting joints on either or both the swash plate and the control rods or levers.

What I claim is:

1. A gimbal-mounted swash plate control assembly comprising an inner ring and an outer ring, one of said rings being rotatable about a polar axis relative to the other, at least one pair of control rods, one of each pair, being mechanically connected to the inner and outer rings respectively to form an input and output control, central mounting means for said rings to allow the swash plate assembly to tilt about any axis, rotation of one of said rings relative to the other providing a range of differential movement ratios between input and output controls.

2. A gimbal-mounted swash plate control assembly according to claim 1 wherein said central mounting means comprises gimbal-mounting means for said inner ring whereby said inner ring is tiltable about any axis independently of or in cooperation with the rotatable ring of said assembly.

3. A gimbal-mounted swash plate control assembly according to claim 2, wherein, the outer ring of said assembly is fixed and the inner ring is rotatable about said polar axis relative to said outer ring and tiltable about any axis.

4. A gimbal-mounted swash plate control assembly according to claim 3 wherein said central mounting means comprises gimbal-mounting means whereby said outer ring is tiltable about any axis and the inner ring is rotatable about said polar axis relative to the outer ring.